United States Patent
Ohanesian

(12)
(10) Patent No.: US 6,364,989 B1
(45) Date of Patent: Apr. 2, 2002

(54) METHOD FOR ENHANCING AN EXTRUDED SUBSTRATE WITH A DECORATIVE LAMINATING FILM

(76) Inventor: Harout Ohanesian, 9 Tattersail La., Laguna Niguel, CA (US) 92677

(*) Notice: Subject to any disclaimer, the term of this patent is extended or adjusted under 35 U.S.C. 154(b) by 0 days.

(21) Appl. No.: 09/399,214

(22) Filed: Sep. 17, 1999

(51) Int. Cl.⁷ .......................... B29C 47/06; B32B 31/20
(52) U.S. Cl. ................. 156/244.27; 156/202; 156/209; 156/244.11; 156/244.18; 156/244.19; 156/248
(58) Field of Search ........................ 156/244.11, 244.27, 156/244.18, 244.19, 244.24, 248, 267, 216, 202, 209; 264/211.12; 160/900

(56) References Cited

U.S. PATENT DOCUMENTS

| | | | |
|---|---|---|---|
| 4,093,486 A | 6/1978 | Honkanen et al. | 156/244.19 |
| 4,221,624 A | 9/1980 | Eslinger et al. | |
| 4,877,077 A | 10/1989 | Ebert | |
| 5,069,947 A | 12/1991 | Hopperdietzel | 428/38 |
| 5,281,290 A * | 1/1994 | Bosler | 156/230 |
| 5,326,520 A | 7/1994 | Franck et al. | 264/171 |
| 5,356,705 A * | 10/1994 | Kelch et al. | 428/332 |
| 5,560,797 A | 10/1996 | Burt et al. | 156/244.19 |
| 5,613,542 A * | 3/1997 | Tuzmen et al. | 160/236 |
| 5,753,063 A | 5/1998 | Sakakibara et al. | 156/219 |
| 6,192,964 B1 * | 2/2001 | Cianci et al. | 160/173 R |

FOREIGN PATENT DOCUMENTS

JP 85086 A * 3/2000 ........... B32B/31/00

* cited by examiner

Primary Examiner—Jeff H. Aftergut
Assistant Examiner—Todd J. Kilkenny
(74) Attorney, Agent, or Firm—Joseph C. Andras; Vic Y. Lin; Myers, Dawes & Andras LLP

(57) ABSTRACT

A method and apparatus for laminating a decorative lamination film to an extruded substrate is disclosed. The decorative lamination film may be clear, translucent, pearlescent, or opaque and it is compressed against the extruded substrate between a pair of rollers. In the context of vertical blind louvers, the rollers and the decorative lamination film are wider than the extruded substrate, the side edges of the extruded substrate being temporarily pressed upward in contact with the lamination film. The roller in contact with the lamination film is heated to a temperature sufficient to melt a central length of the lamination film that is contact with the extruded substrate, and thereby under increased pressure, but not so hot as to melt the unused side lengths of the lamination film. The unused side lengths, therefore, do not melt and naturally separate from the central length.

21 Claims, 3 Drawing Sheets

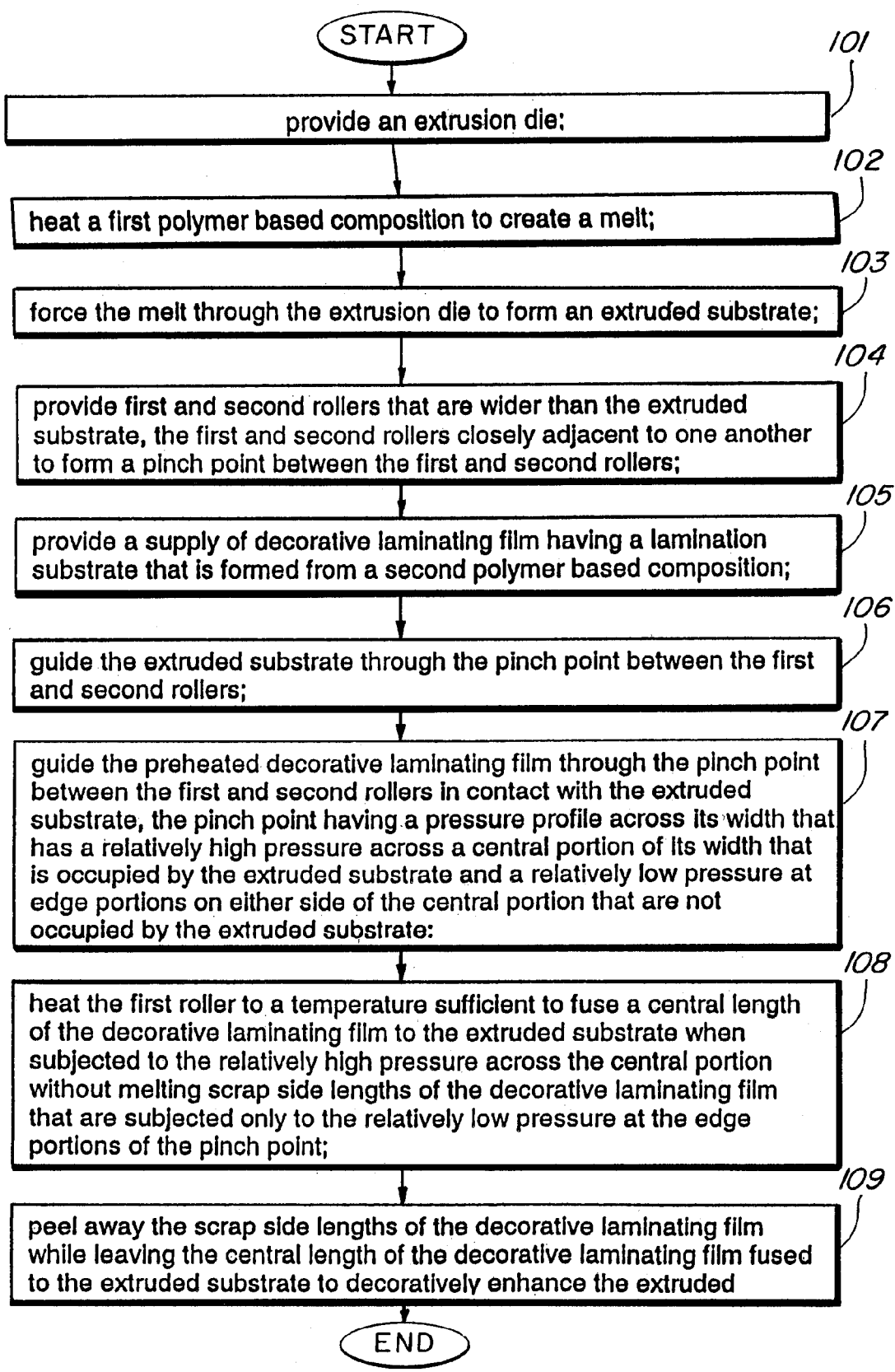

METHOD FOR ENHANCING AN EXTRUDED SUBSTRATE WITH A DECORATIVE LAMINATING FILM

BACKGROUND OF THE INVENTION

1. Field of the invention

The invention relates generally to polymer extrudates and, more particularly, to a method and apparatus for enhancing an extruded substrate with a decorative laminating film.

2. Description of the Related Art

Extrusion equipment is used to manufacture numerous items from thermoplastic resins including, for example, building materials and window coverings. Typical building materials include pipes, floor tiles, and wall members. Typical window coverings include horizontal louvers and vertical slats. In many cases, it is commercially desirable to decoratively enhance one or more surfaces of the extruded article so that is has a desire texture, color, or both. The methods used to date, however, are unsatisfactory from one or more points of view.

For example, in U.S. Pat. No. 4,877,077 that issued to George W. Ebert on Oct. 31, 1989 and is entitled VERTICAL COEXTRUDED PEARLESCENT LOUVER FOR VERTICAL BLINDS, a vertical slat having co-extruded layers is disclosed. The '077 patent, in more detail, discloses a decoratively enhanced louver wherein an opaque substrate is co-extruded with a pearlescent layer. The '077 structure is aesthetically pleasing, but relatively complicated to manufacture because of the co-extrusion requirements. Also, it takes a relatively long period of time to switch over from one color to another, it being necessary to completely reload the extrusion equipment.

There remains a need, therefore, for a method and apparatus which efficiently and cost effectively provides a decoratively enhanced substrate and, more particularly, does so without need for complicated co-extrusion techniques.

SUMMARY OF THE INVENTION

In a first aspect, the invention may be regarded as a method of decoratively enhancing an extruded substrate comprising: providing an extrusion die; heating a first polymer based composition to create a melt; forcing the melt through the extrusion die to form an extruded substrate; providing first and second rollers that are wider than the extruded substrate, the first and second rollers closely adjacent to one another to form a pinch point between the first and second rollers; providing a supply of decorative laminating film having a lamination substrate that is formed from a second polymer based composition; guiding the extruded substrate through the pinch point between the first and second rollers; guiding the preheated decorative laminating film through the pinch point between the first and second rollers in contact with the extruded substrate, the pinch point having a pressure profile across it width that has a relatively high pressure across a central portion of its width that is occupied by the extruded substrate and a relatively low pressure at edge portions on either side of the central portion that are not occupied by the extruded substrate; heating the first roller to a temperature sufficient to fuse a central length of the decorative laminating film to the extruded substrate when subjected to the relatively high pressure across the central portion without melting scrap side lengths of the decorative laminating film that are subjected only to the relatively low pressure at the edge portions of the pinch point; and peeling away the scrap side lengths of the decorative laminating film while leaving the central length of the decorative laminating film fused to the extruded substrate to decoratively enhance the extruded substrate.

In a second aspect, the invention may be regarded as an apparatus for decoratively enhancing an extruded substrate comprising: an extrusion die; means for heating a first polymer based composition to create a melt; means for forcing the melt through the extrusion die to form an extruded substrate; a first roller wider than the extruded substrate; a second roller wider than the extruded substrate, the second roller closely adjacent to the first roller to form a pinch point between the first and second rollers; the first and second rollers adjacent to the extrusion die to continuously receive the extruded substrate in the pinch point; a supply reel of decorative laminating film having a lamination substrate that is formed from a second polymer based composition; means for preheating the decorative laminating film to a first temperature which is below a melting point of the decorative laminating film at ambient pressure; means for guiding the preheated decorative laminating film through the pinch point between the first and second rollers in contact with the extruded substrate; the pinch point having a pressure profile across it width that has a relatively high pressure across a central portion of its width that is occupied by the extruded substrate and a relatively low pressure at edge portions on either side of the central portion that are not occupied by the extruded substrate; means for heating the first roller to a second higher temperature sufficient to fuse a central length of the decorative laminating film to the extruded substrate when subjected to the relatively high pressure across the central portion without melting scrap side lengths of the decorative laminating film that are subjected only to the relatively low pressure at the edge portions of the pinch point; and means for peeling away the scrap side lengths of the decorative laminating film while leaving the central length of the decorative laminating film fused to the extruded substrate to decoratively enhance the extruded substrate.

In a third aspect, the invention comprises a method of decoratively enhancing an extruded substrate comprising the step of: providing an extrusion die; heating a first polymer based composition to create a melt; forcing the melt through the extrusion die to form an extruded substrate; providing a roller; guiding the extruded substrate below the roller; providing a supply of decorative laminating film having a lamination substrate that is formed from a second polymer based composition; guiding the decorative laminating film between the roller and the extruded substrate, the roller pressing the decorative laminating film against the extruded substrate to fuse the decorative laminating film with the extruded substrate.

BRIEF DESCRIPTION OF THE DRAWINGS

The just summarized invention may best be understood with reference to the Figures of which:

FIG. 3 is a flow chart of a method according to this invention.

DETAILED DESCRIPTION OF THE PREFERRED EMBODIMENT

Figure 1:
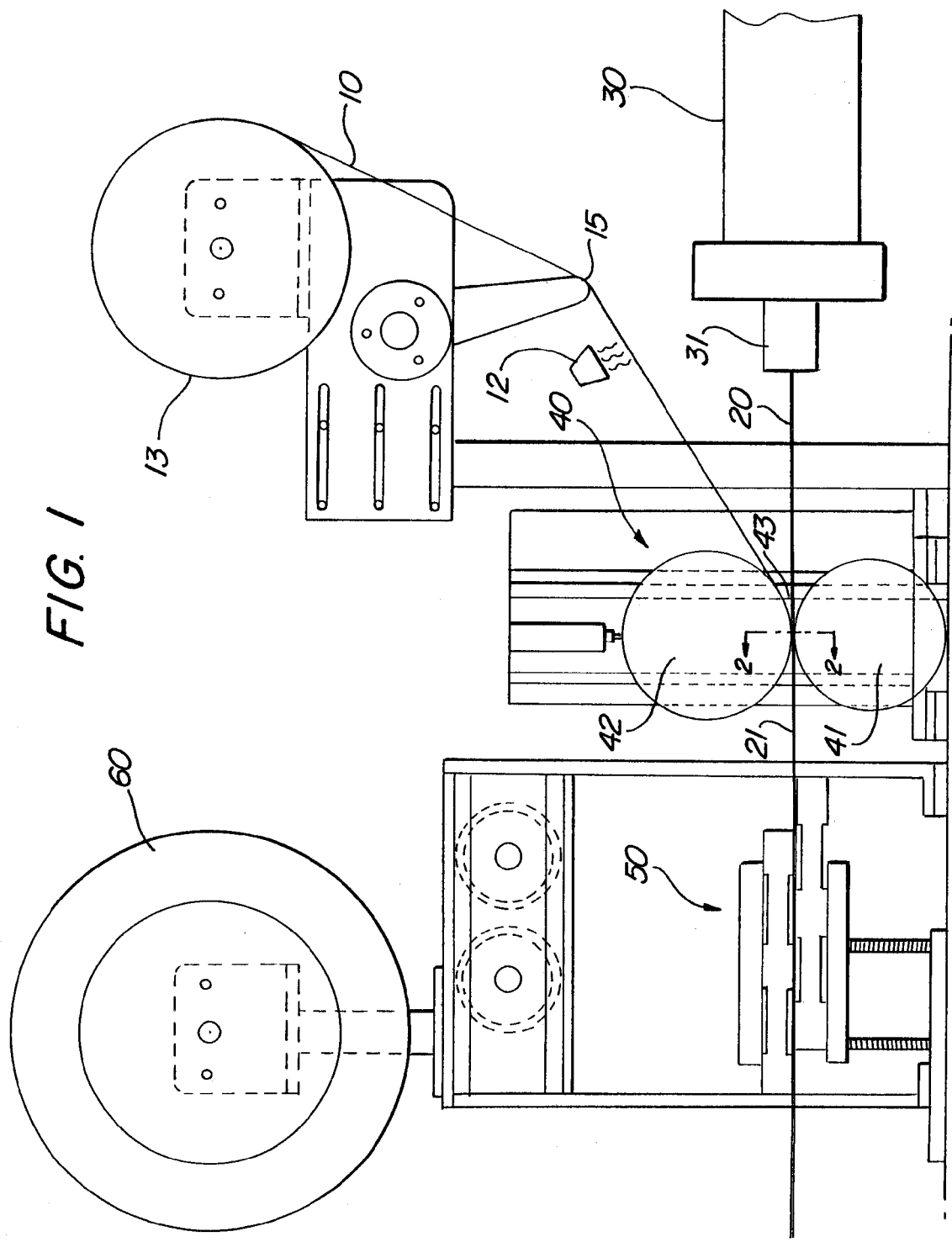
FIG. 1 is a schematic plan view of an apparatus according to this invention wherein a decorative laminating film is continuously fused to an extruded substrate.

FIG. 1 shows a schematic plan view of an apparatus 100 according to this invention. As shown, a decorative laminating film 10 is continuously fused to an extruded substrate 20 to form a decoratively enhanced product 21. The decorative enhancement film 10 generally imparts a solid color or color pattern to the extruded substrate 20 to form the decoratively enhanced product 21. However, the decoratively enhanced product 21 may also be embossed with a texture (as discussed below). This particular embodiment is directed to the fabrication of vertical blind slats, but it should be understood that this invention may be implemented with regard to any number of extruded articles.

In FIG. 1, the extruded substrate 20 is created by an extruder 30 which is heated and continuously supplied with thermoplastic resin pellets via a hopper (not shown). The possible thermoplastic resins include ABS, PS, PE, PVC, or any other resin suitable for the extrusion of thermoplastic sheets. PVC is the preferred resin in the case of vertical blind louvers. A die head 31 at the front end of the extruder includes an aperture (not shown) having a profile conforming to the desired profile of the extruded substrate 20. In the context of this invention, the die head 31 may be relatively simple, as compared to the co-extrusion head which must be used in accordance with the '077 patent.

A pair of rollers 40 are located downstream from the die head 31. The roller pair 40 includes a first roller 41 and a second roller 42 located adjacent to the first roller 41 to form a pinch point 43. The pinch point 43 should have a height less than a height of the extruded substrate 20 so that it compresses the decorative laminating film 10 against the extruded substrate 20 by an amount required by this invention (discussed further below). In the preferred embodiment, the first roller 41 is located below the second roller 42. The rollers 41, 42 are not heated, but in the case of complex patter, for example, it may be desirable to heat the roller 41, the roller 42, or both, particularly the one that is in contact tiwh the extruded substrate. The roller 42 may be heated internally to a temperature that is suitable for fusing the decorative laminating film to the extruded substrate and pressing the decorative laminating film 10 against the extruded substrate 20. The first roller 41 preferably comprises a rubber cylinder (e.g. sylicone) which rotates about an axis and can withstand the heat emanating from the extruded substrate 20, the decorative laminating film 10, and the internally-heated second roller 42.

The second roller 42 which contacts the lamination substrate 10 may optionally have a textured surface formed thereon to impart a desired texture to the decoratively enhanced product 21. In the preferred system, it is a simple matter to swap rollers which have different textures.

The decorative laminating film 10 is preferably contained on a supply reel 13 located in advance of the entry to the pinch point 43. As shown, the apparatus 100 is arranged such that the extruded substrate 20 and the decorative laminating film 10 simultaneously feed through the pinch point 43 between the first and second rollers 41, 42. At this juncture, therefore, the decorative laminating film 10 is fused to the extruded substrate so as to impart a desired decorative enhancement. The laminating film 10 is preferably preheated with, for example, an infrared heat lamp 12 of other suitable means for heating such as hot air or a heated rod. In the preferred embodiment, the lamination film 10 is passed over a convex roller 15 (aka "banana" roller) located between the supply roller 10 and the pinch point 43, the decorative laminating film 10 passing over the convex roller before entering the pinch point with the extruded substrate to first press a central length of the decorative laminating film against the extruded substrate 20 and thereby minimize creases and air bubbles. The system, in other words, laminates from the center outward.

A decoratively enhanced product 21 exits the downstream side of the pinch point 43 between the first and second rollers 41, 42, and passed through a calibrator (cooling structure) 50 as is well known in the art.

The preferred decorative laminating film 10 is itself an extruded product having a lamination substrate. The lamination substrate may be clear, translucent, pearlescent, or opaque. It may also be comprised of one solid color, or may have a decorative pattern (e.g. flowers, geometric designs, and so on) printed thereon.

The lamination substrate is preferably from 20 to 500 microns thick depending on the application in order to provide a durable "skin" when fused to the extruded substrate 20. The lamination substrate, of course, should be based on a thermoplastic resin that is compatible with the resin used to form the extruded substrate 20. They could be identical, or they could simply be selected from the same family of resins. In the case of vertical louvers which use an extruded substrate 20 made of PVC, for example, the decorative laminating film 10 would comprise a lamination substrate that is also formed of PVC. In this PVC to PVC scenario, the underside of the decorative laminating substrate 10 is preferably coated with a bonding agent such as VMCH The bonding agent is applied to the lamination film 10, at the time of making the same, by diluting a solid resin with a solvent to form a liquid that may be sprayed or printed onto the film 10. The film 10 is then passed through an oven to evaporate the solvent and leave behind a solid coating of the bonding agent, which agent assists in bonding the film 10 to the substrate 20 in the apparatus of FIG. 1. Other materials may not require a bonding agent. A PE to PE arrangement, for example, may be suitably accomplished without using a bonding agent. In either case, the lamination film 10 may further have a protective layer of acrylic, for example, to make the overall decoratively enhanced product 21 scratch resistant.

A further feature of the present invention is its unique ability to apply a decorative lamination film 10 to the edges of the extruded substrate 20. This is possible for two reasons. First, the decorative lamination film 10 is wider than the extruded substrate by about ¼' (a relationship which is highly also desirable because the width of the extruded substrate 20 is subject to some degree of variance due to manufacturing tolerances). Second, when the extruded substrate 20 (still hot and pliable) is compressed in the pinch point 43, the thermoplastic "beads" that it is composed of are temporarily compressed upward, at the side edges thereof, such that those side edges are also fused with the decorative lamination film 10. The side edges return to their perpendicular orientation after the decoratively enhanced product 21 leaves the roller pair 40.

Figure 2:
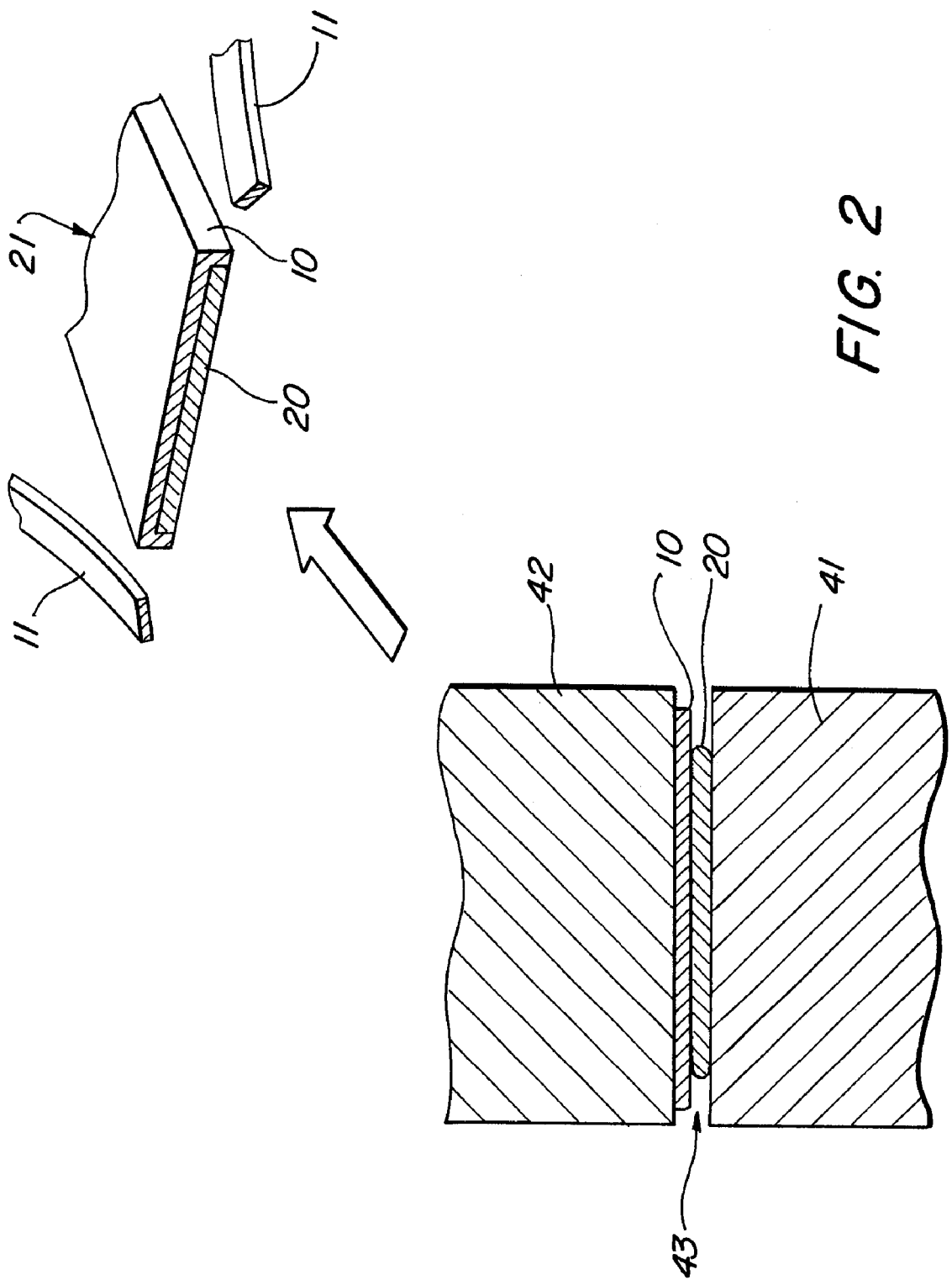
FIG. 2 is a cross-sectional view of FIG. 1 taken along section lines 2—2.

FIG. 2 is a cross-sectional view of FIG. 1 taken along section lines 2—2. As shown, this invention takes unique advantage of the fact that the melting point of the decorative lamination film 10 is a function of both heat and pressure. In particular, because a central length (not separately numbered) of the decorative lamination film 10 is compressed with the extruded substrate 20, it is subject to greater pressure than are the two side lengths 11 on either side thereof. The result is that the central length of the film 10 is melted, but the two side lengths are not melted and are simply peeled away from the overall decoratively enhanced product 21, wound around a take-up wheel 60 (see FIG. 1), and ultimately reground as desired.

FIG. 3 is a flow chart illustrating the steps in a presently preferred method of decoratively enhancing an extruded substrate according to this invention. The general steps are providing an extrusion die (step 101); heating a first polymer based composition to create a melt (step 102); forcing the melt through the extrusion die to form an extruded substrate (step 103); providing first and second rollers that are wider than the extruded substrate, the first and second rollers closely adjacent to one another to form a pinch point between the first and second rollers (step 104); providing a supply of decorative laminating film having a lamination substrate that is formed from a second polymer based composition (step 105); guiding the extruded substrate through the pinch point between the first and second rollers (step 106); guiding the preheated decorative laminating film through the pinch point between the first and second rollers in contact with the extruded substrate, the pinch point having a pressure profile across its width that has a relatively high pressure across a central portion of its width that is occupied by the extruded substrate and a relatively low pressure at edge portions on either side of the central portion that are not occupied by the extruded substrate (step 107); heating the first roller to a temperature sufficient to fuse a central length of the decorative laminating film to the extruded substrate when subjected to the relatively high pressure across the central portion without melting scrap side lengths of the decorative laminating film that are subjected only to the relatively low pressure at the edge portions of the pinch point (step 108); and peeling away the scrap side lengths of the decorative laminating film while leaving the central length of the decorative laminating film fused to the extruded substrate to decoratively enhance the extruded substrate (step 109). These method steps are preferably implemented on an apparatus as illustrated in FIG. 1 to produce a product as shown in FIG. 2. Other apparatus and products are, however, within the scope of this novel method.

The foregoing description was intended to describe a presently preferred embodiment of the present invention, but the scope of this invention is as set forth in the following claims which should in no way be limited to the embodiment above.

I claim:
1. A method of decoratively enhancing an extruded substrate comprising:
   providing an extrusion die;
   heating a first polymer based composition to create a melt;
   forcing the melt through the extrusion die to form an extruded substrate;
   providing first and second rollers that are wider than the extruded substrate, the first and second rollers closely adjacent to one another to form a pinch point between the first and second rollers;
   providing a supply of decorative laminating film having a lamination substrate that is formed from a second polymer based composition;
   guiding the extruded substrate through the pinch point between the first and second rollers;
   guiding the decorative laminating film through the pinch point between the first and second rollers in contact with the extruded substrate;
   heating the first roller to a temperature sufficient to fuse the decorative laminating film to the extruded substrate;
   providing the pinch point with a pressure profile across its width that has a first pressure across a central portion of its width that is occupied by the extruded substrate and a second pressure at edge portions on either side of the central portion that are not occupied by the extruded substrate, the first pressure being higher than the second pressure; and
   heating the first roller to a temperature sufficient to fuse a central length of the decorative laminating film to the extruded substrate when subjected to the first pressure across the central portion without melting scrap side lengths of the decorative laminating film that are subjected only to the lower, second pressure at the edge portions of the pinch point.

2. The method of claim 1 comprising the further step of:
   peeling away the scrap side lengths of the decorative laminating film while leaving the central length of the decorative laminating film fused to the extruded substrate to decoratively enhance the extruded substrate.

3. The method of claim 1 comprising the further step of preheating the decorative laminating film to a temperature that is below a melting point of the decorative laminating film at ambient pressure before guiding the decorative laminating film through the pinch point between the first and second rollers in contact with the extruded substrate.

4. The method of claim 1 wherein the extruded substrate is used to form vertical louvers having a top surface, a bottom surface opposite the top surface, a first side edge, and a second side edge opposite the first side edge.

5. The method of claim 4 wherein a pressure profile of the pinch point is such that the first and second side edges are temporarily pressed upward against the decorative laminating film, the top surface and the first and second side edges of the vertical louvers being laminated as a result thereof.

6. The method of claim 1 wherein the first polymer based composition of the extruded substrate includes PVC.

7. The method of claim 6 wherein the second polymer based composition of the laminating substrate includes PVC.

8. The method of claim 7 comprising the further step of providing a bonding agent on a surface of the laminating substrate that contacts the extruded substrate.

9. The method of claim 1 further comprising the further step of passing the decorative laminating film over a convex roller before guiding the decorative laminating film into the pinch point to first press the central length of the decorative laminating film against the extruded substrate to minimize creases and air bubbles.

10. The method of claim 2 further comprising the further step of receiving the scrap side lengths of the decorative laminating film on a take-up reel for later re-use.

11. The method of claim 1 comprising the further step of embossing the decorative laminating film and the extruded substrate while guiding the decorative laminating film through the pinch point between the first and second rollers in contact with the extruded substrate.

12. The method of claim 11 wherein the embossing step is accomplished with a texture on the first roller.

13. A method of decoratively enhancing an extruded substrate comprising:
   providing an extrusion die;
   heating a first polymer based composition to create a melt;
   forcing the melt through the extrusion die to form an extruded substrate; providing a roller; guiding the extruded substrate below the roller;
   providing a supply of decorative laminating film having a lamination substrate that is formed from a second polymer based composition;
   guiding the decorative laminating film between the roller and the extruded substrate, the roller pressing the decorative laminating film against the extruded substrate to fuse the decorative laminating film with the extruded substrate;

applying a first pressure across a central portion of the decorative laminating film that is in contact with the extruded substrate and a second pressure at edge portions on either side of the central portion that are not in contact with the extruded substrate, the first pressure being higher than the second pressure; and heating the roller to a temperature sufficient to fuse a central length of the decorative laminating film to the extruded substrate when subjected to the first pressure across the central portion without melting scrap side lengths of the decorative laminating film that are subjected only to the lower, second pressure.

14. The method of claim 13 further comprising the step of peeling away the scrap side lengths of the decorative laminating film while leaving the central length of the decorative laminating film fused to the extruded substrate to decoratively enhance the extruded substrate.

15. The method of claim 14 further comprising the further step of receiving the scap side lengths of the decorative laminating film on a take-up reel for later re-use.

16. The method of claim 13 comprising the further step of preheating the decorative laminating film to a temperature that is below a melting point of the decorative laminating film at ambient pressure before guiding the decorative laminating film through the pinch point between the first and second rollers in contact with the extruded substrate.

17. The method of claim 13 wherein the extruded substrate is used to form vertical louvers having a top surface, a bottom surface opposite the top surface, a first side edge, and a second side opposite the first side edge.

18. The method of claim 17 wherein a pressure profile of the pinch point is such that the first and second side edges are temporarily pressed upward against the decorative laminating film, the top surface and the first and second side edges of the vertical louvers being laminated as a result thereof.

19. The method of claim 13 comprising the further step of providing a bonding agent on a surface of the laminating substrate that contacts the extruded substrate.

20. The method of claim 13 further comprising the further step of passing the decorative laminating film over a convex roller before guiding the decorative laminating film into the pinch point to first press the central length of the decorative laminating film against the extruded substrate to minimize creases and air bubbles.

21. The method of claim 13 comprising the further step of embossing the decorative laminating film and the extruded substrate while guiding the decorative laminating film through the pinch point between the first and second rollers in contact with the extruded substrate.

* * * * *